(12) United States Patent
Kanazawa et al.

(10) Patent No.: US 8,493,179 B2
(45) Date of Patent: Jul. 23, 2013

(54) COMMUNICATION APPARATUS

(75) Inventors: Akiyoshi Kanazawa, Susono (JP); Ken Ito, Susono (JP)

(73) Assignee: Yazaki Corporation, Tokyo (JP)

( * ) Notice: Subject to any disclaimer, the term of this patent is extended or adjusted under 35 U.S.C. 154(b) by 1407 days.

(21) Appl. No.: 12/053,869

(22) Filed: Mar. 24, 2008

(65) Prior Publication Data

US 2008/0293454 A1 Nov. 27, 2008

(30) Foreign Application Priority Data

May 23, 2007 (JP) ................................ 2007-137023

(51) Int. Cl.
*H02J 13/00* (2006.01)

(52) U.S. Cl.
USPC .......................................................... 340/9.1

(58) Field of Classification Search
USPC ...................... 340/9.1, 2.2, 3.1, 5.1
See application file for complete search history.

(56) References Cited

U.S. PATENT DOCUMENTS

| | | | |
|---|---|---|---|
| 5,680,113 A | 10/1997 | Allen | |
| 5,684,469 A | 11/1997 | Toms et al. | |
| 5,942,984 A * | 8/1999 | Toms et al. | 340/3.5 |
| 6,262,541 B1 * | 7/2001 | Asai | 315/169.4 |
| 6,292,541 B1 | 9/2001 | Tice et al. | |
| 6,310,460 B1 | 10/2001 | Takagi | |
| 2006/0246892 A1 | 11/2006 | VonDoenhoff | |

FOREIGN PATENT DOCUMENTS

| | | |
|---|---|---|
| EP | 1653363 A1 | 5/2006 |
| JP | 05-144905 A | 6/1993 |
| JP | 05-176453 A | 7/1993 |
| JP | 9-511365 A | 11/1997 |
| JP | 2000-165302 A | 6/2000 |
| JP | 2001-45671 A | 2/2001 |
| JP | 2002-374545 A | 12/2002 |
| JP | 2003-127646 A | 5/2003 |
| JP | 2005-269468 A | 9/2005 |
| JP | 2005-276489 A | 10/2005 |
| JP | 2006-179375 A | 7/2006 |

OTHER PUBLICATIONS

Extended European Search Report dated Sep. 7, 2009.
Communication, dated Nov. 22, 2011, issued by the Japanese Patent Office in corresponding Japanese Application No. 2007/137023.
Office Action Issued Mar. 27, 2012, by the Intellectual Property Office of Japan in counterpart Japanese Application No. 2007-137023.

* cited by examiner

*Primary Examiner* — Vernal Brown
(74) *Attorney, Agent, or Firm* — Sughrue Mion, PLLC

(57) ABSTRACT

A communication apparatus for performing a communication with other communication apparatus by using identification information, includes a housing, a plurality of grounding terminals which are respectively connected to one ends of internal grounding lines provided within the housing for connecting to an external grounding line outside the housing, a grounding line connection detection section which detects a grounding terminal connected to the external grounding line among the plurality of grounding terminals, and an identification information setting section which sets the identification information based on a detection result of the grounding line connection detection section.

5 Claims, 7 Drawing Sheets

| ID | TG1 | TG2 | TG3 | TG4 | TG5 |
|----|-----|-----|-----|-----|-----|
| 1  | 1   | 0   | 0   | 0   | 0   |
| 2  | 0   | 1   | 0   | 0   | 0   |
| 3  | 0   | 0   | 1   | 0   | 0   |
| 4  | 0   | 0   | 0   | 1   | 0   |
| 5  | 0   | 0   | 0   | 0   | 1   |

*FIG. 7*

| ID | TV2 | TV1 | TG2 | TG1 |
|----|-----|-----|-----|-----|
| 1  | 0   | 1   | 0   | 1   |
| 2  | 0   | 1   | 1   | 0   |
| 3  | 1   | 0   | 0   | 1   |
| 4  | 1   | 0   | 1   | 0   |
| 5  | 1   | 1   | 0   | 1   |
| 6  | 1   | 1   | 1   | 0   |
| 7  | 0   | 1   | 1   | 1   |
| 8  | 0   | 1   | 1   | 0   |

COMMUNICATION APPARATUS

BACKGROUND

This invention relates to a communication apparatus, and more particularly to a communication apparatus for performing a communication while effecting the transmission and reception of identification information with other communication apparatuses.

As a communication system incorporating communication apparatuses of the type described above, there has been proposed, for example, a vehicular communication system (see, for example, Patent Literatures 1 and 2) as shown in FIG. 8. As shown in FIG. 8, the vehicular communication system includes a plurality of function-containing connectors (hereinafter referred to as "e-connectors") C1 to CN (serving as communication apparatuses) connected to one external communication line LC1.

Each of the e-connectors C1 to CN performs the transmission and reception of signals with the other e-connectors C1 to CN via the external communication line LC1, and controls the operations of a plurality of auxiliary equipments 11 to 1n, . . . , N1 to Nn. Each of the e-connectors C1 to CN includes a control unit 60 (comprising a CPU, etc.) for controlling the whole of the e-connector C1, . . . , CN.

In order to achieve the transmission and reception of signals in this construction in which the plurality of e-connectors C1 to CN are connected to the single external communication line LC1, IDs serving as identification information are set respectively in the e-connectors C1 to CN. Each of the e-connectors C1 to CN transmits signals, with transmission destination IDs and its own ID attached thereto, and also receives signals having its own ID attached thereto.

If the above IDs are not set, the e-connectors C1 to CN connected to the single external communication line LC1 can not properly transmit and receive the signals, and the setting of the IDs are indispensable. The setting of the IDs is effected, for example, by providing a group of internal switches SW in each e-connector C1, . . . , CN or by storing the IDs respectively in nonvolatile memories or the like of the e-connectors C1 to CN at the time of manufacturing these e-connectors.

However, when the e-connectors C1 to CN have the same appearance, these e-connectors can not be distinguished from one another, and therefore with the above ID setting method, there is a fear that the e-connectors are erroneously connected, and therefore can not be properly controlled, thus resulting in the defective product. In order to prevent such erroneous connection, it may be proposed to make the e-connectors C1 to CN different in shape from one another. In this case, however, it is necessary to prepare e-connectors C1 to CN of different shapes, and this is disadvantageous from the viewpoint of the cost.

[Patent Literature 1]   JP-A-2005-276489
[Patent Literature 2]   JP-A-2003-127646

SUMMARY

With the above problem in view, it is an object of this invention to provide a low-cost communication apparatus which is designed to prevent an erroneous connection.

In order to achieve the above object, according to the present invention, there is provided a communication apparatus for performing a communication with other communication apparatus by using identification information, comprising:

a housing;

a plurality of grounding terminals which are respectively connected to one ends of internal grounding lines provided within the housing for connecting to an external grounding line outside the housing;

a grounding line connection detection section which detects a grounding terminal connected to the external grounding line among the plurality of grounding terminals; and an identification information setting section which sets the identification information based on a detection result of the grounding line connection detection section.

In the above configuration, the grounding line connection detection section detects that grounding terminal connected to the external grounding line among the plurality of grounding terminals, and the identification information setting section sets the identification information corresponding to the detection result of the grounding line connection detection section. Therefore, even when the plurality of communication apparatuses have the same shape, IDs of the communication apparatuses can be easily grasped by viewing the external grounding line connected to the grounding terminals.

Preferably, the plurality of grounding terminals are connected to the internal grounding lines via respective diodes whose forward direction is from the internal grounding lines toward the grounding terminals, and are supplied with a predetermined voltage via respective resistors. When the electric potential of any of the plurality of grounding terminals is a ground potential, the grounding line connection detection section detects that the grounding terminal whose electric potential is the ground potential is connected to the external grounding line.

In the above configuration, when the potential of any of the plurality of grounding terminals is the ground potential, the grounding line connection detection section detects that the external grounding line is connected to that grounding terminal. Therefore, merely by detecting the potentials of the plurality of grounding terminals, whether or not these grounding terminals are connected to the external grounding line can be detected.

Preferably, the communication apparatus further comprises a plurality of power terminals which are respectively connected to one ends of internal power lines provided within the housing for connecting to an external power line outside the housing, and a power line connection detection section which detects a power terminal connected to the external power line among the plurality of power terminals. The identification information setting section sets the identification information based on both of the detection result of the grounding line connection detection section and a detection result of the power line connection detection section.

In the above configuration, the power line connection detection section detects a power terminal connected to the external power line among the plurality of power terminals, and the identification information setting section sets the identification information based on both of the detection result of the grounding line connection detection section and a detection result of the power line connection detection section. Therefore, even when the plurality of communication apparatuses have the same shape, the IDs of the communication apparatuses can be easily grasped by viewing the external grounding line connected to the grounding terminals and the external power line connected to the power terminals.

According to the present invention, there is also provided a communication apparatus for performing a communication with other communication apparatus by using identification information, comprising:

a housing;

a plurality of power terminals which are respectively connected to one ends of internal power lines provided within the housing for connecting to an external power line outside the housing;

a power line connection detection section which detects a power line connected to the external power line among the plurality of power terminals; and an identification information setting section which sets the identification information based on a detection result of the power line connection detection section.

In the above configuration, the power line connection detection section detects a power terminal connected to the external power line among the plurality of power terminals, and the identification information setting section sets the identification information based on the detection result of the power line connection detection section. Therefore, even when the plurality of communication apparatuses have the same shape, the IDs of the communication apparatuses can be easily grasped by viewing the external power line connected to the power terminals.

Preferably, the plurality of power terminals are connected to the internal power lines via respective diodes whose forward direction is from the power terminals toward the internal power line, and are supplied with the ground potential via respective resistors. When the electric potential of any of the plurality of power terminals is a power source voltage, the power line connection detection section detects that the power terminal whose electric potential is the power source voltage is connected to the external power line.

In the above configuration, when the potential of any of the plurality of power terminals is the power source voltage, the power line connection detection section detects that the external power line is connected to that power terminal. Therefore, merely by detecting the potentials of the plurality of power terminals, whether or not these power terminals are connected to the external power line can be detected.

As described above, even when the plurality of communication apparatuses have the same shape, the IDs of the communication apparatuses can be easily grasped by viewing the external grounding line connected to the grounding terminals. Therefore, the communication apparatus which prevents an erroneous connection can be provided at a low cost.

In the above configuration, merely by detecting the potentials of the plurality of grounding terminals, whether or not these grounding terminals are connected to the external grounding line can be detected. Therefore, the construction is simplified, and the cost can be further lowered.

In the above configuration, even when the plurality of communication apparatuses have the same shape, the IDs of the communication apparatuses can be easily grasped by viewing the external grounding line connected to the grounding terminals and the external power line connected to the power terminals. Therefore, the communication apparatus which prevent an erroneous connection can be provided at the low cost.

In the above configuration, even when the plurality of communication apparatuses have the same shape, the IDs of the communication apparatuses can be easily grasped by viewing the external power line connected to the power terminals. Therefore, the communication apparatus which prevents an erroneous connection can be provided at the low cost.

In the above configuration, merely by detecting the potentials of the plurality of power terminals, whether or not these power terminals are connected to the external power line can be detected. Therefore, the construction is simplified, and the cost can be further lowered.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7 is an illustration showing an ID table stored in a storage portion within a control unit of FIG. 6.

DETAILED DESCRIPTION OF EXEMPLARY EMBODIMENTS (First Embodiment)

Figure 1:
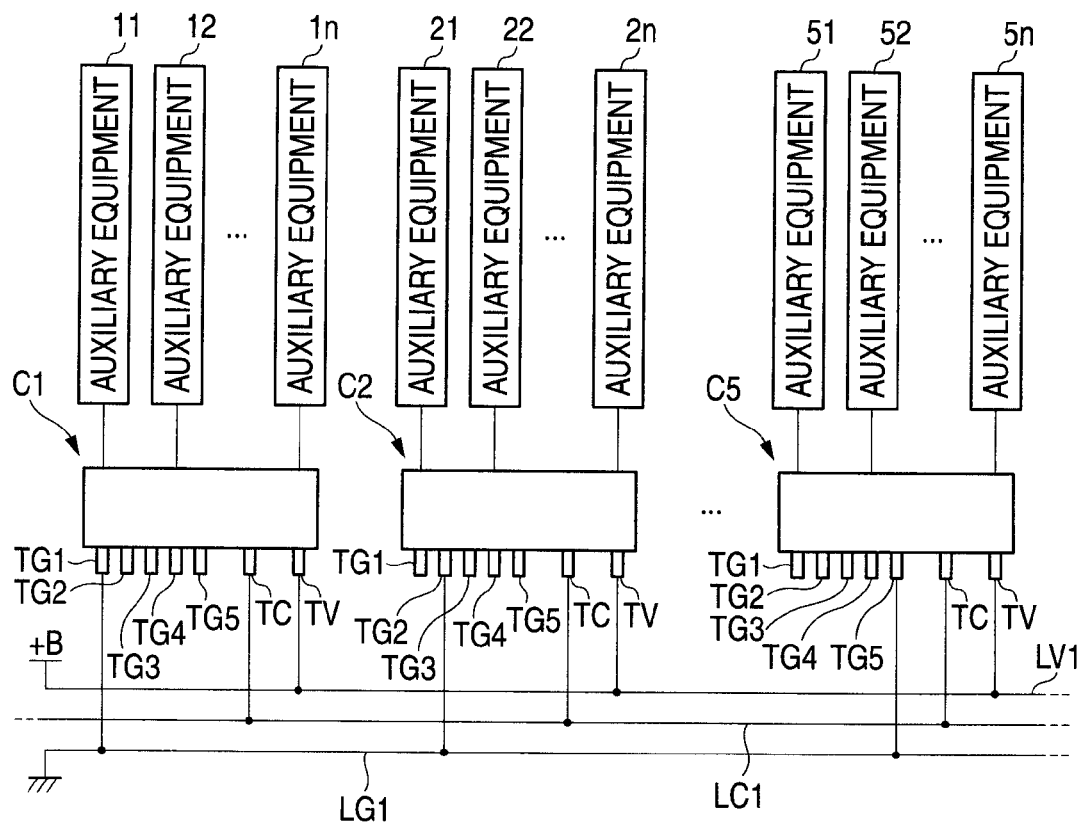
FIG. 1 is a view showing a vehicular communication system incorporating e-connectors each serving as a first embodiment of a communication apparatus of the present invention.
Figure 2:
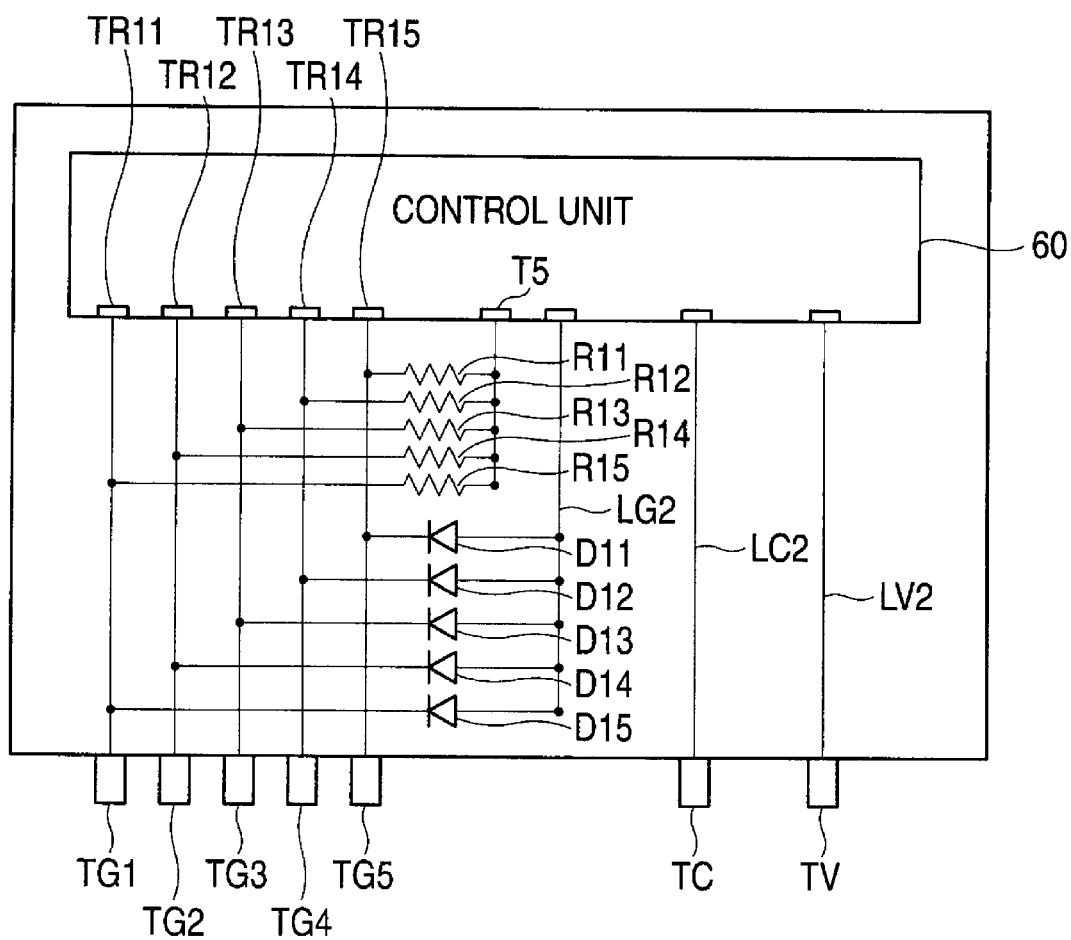
FIG. 2 is an electrical diagram of the e-connectors shown in FIG. 1.

A first embodiment of the present invention will now be described with reference to the drawings. FIG. 1 is a view showing a vehicular communication system incorporating e-connectors C1 to C5 each serving as a first embodiment of a communication apparatus of the invention. FIG. 2 is an electrical diagram of the e-connectors C1 to C5 shown in FIG. 1. As shown in these Figures, the vehicular communication system comprises, for example, the five e-connectors C1 to C5 located respectively at portions of a vehicle. Auxiliary equipments 11 to 1n, 21 to 2n, . . . , 51 to 5n are connected to the respective e-connectors C1 to C5.

Each of the e-connectors C1 to C5 comprises a control unit 60, a power terminal TV, a communication terminal TC and a plurality of (for example, five) grounding terminals TG1 to TG5, these terminals being exposed to the exterior of the e-connector C1, . . . , C5. The control unit 60 comprises a CPU, etc., and controls the corresponding auxiliary equipments 11 to 1n, 21 to 2n, 51 to 5n.

The power terminal TV is provided at one end of an internal power line LV2 within the e-connector C1, . . . , C5. An external power line LV1 outside the e-connectors C1 to C5 is connected to the power terminal TV. The control unit 60 is connected to the other end of the internal power line LV2, and is supplied with a power source voltage from the external power line LV1 via the internal power line LV2 and the power terminal TV.

The communication terminal TC is provided at one end of an internal communication line LC2 within the e-connector C1, . . . , C5. An external communication line LC1 outside the e-connectors C1 to C5 is connected to the communication terminal TC. The control unit 60 of each e-connector C1, . . . , C5 is connected to the other end of the internal communication line LC2, and effects the transmission and reception of communication signals with the control units 60 of other e-connectors (C1 to C5) via the internal communication line LC2 and the communication terminal TC.

The number of the grounding terminals TG1 to TG5 is, for example, equal to the number of the e-connectors C1 to C5 connected together via the external communication line LC1. In this embodiment, there are provided the five grounding terminals TG1 to TG5. One end of an internal grounding line LG2 is branched into five sections at which the grounding terminals TG1 to TG5 are provided, respectively. An external grounding line LG1 outside the e-connectors C1 to C5 is connected to the grounding terminals TG1 to TG5.

The plurality of grounding terminals TG1 to TG5 are connected to the internal grounding line LG2 via respective diodes D11 to D15 whose forward direction is from the internal grounding line LG2 toward the grounding terminals TG1 to TG5. The control unit 60 is connected to the other end of the internal grounding line LG2, and is supplied with a ground potential from the external grounding line LG1 via the internal grounding line LG2 and the grounding terminal TG1, . . . , TG5.

The plurality of grounding terminals TG1 to TG5 are connected to a 5V voltage output terminal T5 via respective resistors R11 to R15, and are supplied with a voltage of 5V. The grounding terminals TG1 to TG5 are connected respectively to ID recognition terminals TR11 to TR15 provided at the control unit 60.

In the above construction, the potential of that grounding terminal TG1, . . . , TG5 connected to the external grounding line LG1 is the ground potential, and therefore the potential of the ID recognition terminal TR11, TR15 connected to this grounding terminal TG1, . . . , TG5 is also the ground potential. Those grounding terminals (TG1, . . . , TG5) which are not connected to the external grounding line LG1 are in an open condition, and therefore the potential of those ID recognition terminals (TR11, . . . , TR15) connected respectively to these open grounding terminals is 5V.

Therefore, when the potential of the ID recognition terminal TR11, . . . , TR15 is the ground potential, it is judged that this ID recognition terminal is connected to the external grounding line LG1. In contrast, when the potential of the ID recognition terminal TR11, . . . , TR15 is 5V, it is judged that this ID recognition terminal is not connected to the external grounding line LG1. The direction of current flow is restricted by the diodes D11 to D15, and therefore even when for example, the grounding terminal TG1 is connected to the external grounding line LG1, and therefore is kept at the ground potential, the potential of the other grounding terminals TG2 to TG5 which are not connected to the external grounding line LG1 will not become the ground potential.

Figures 3, 4:
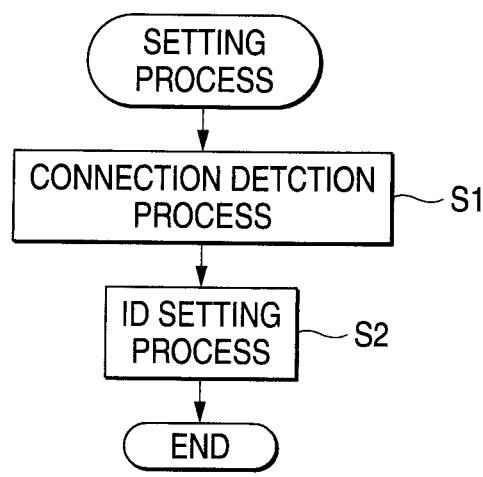
FIG. 3 is a flow chart showing the procedure of an identification information setting process effected by a control unit within each e-connector shown in FIG. 1.
FIG. 4 is an illustration showing an ID table stored in a storage portion within the control unit of FIG. 2.

An ID setting operation in the vehicular communication system of the above construction will be described below with reference to FIG. 3. FIG. 3 is a flow chart showing the procedure of a setting process of the control unit 60 of each of the e-connectors C1 to C5 shown in FIG. 1.

First, in a manufacturing process, the worker locates the e-connectors C1 to C5 respectively at the relevant portions of the vehicle. Then, the auxiliary equipments 11 to 1n, 21 to 2n, . . . , 51 to 5n are connected to the corresponding e-connectors C1 to C5. Wires branched from the external power line LV1 are connected respectively to the power terminals TV of the e-connectors C1 to C5, and wires branched from the external communication line LC1 are connected respectively to the communication terminals TC of the e-connectors C1 to C5, and wires branched from the external grounding line LG1 are connected respectively to the grounding terminals TG1 to TG5.

At this time, the worker connects the grounding terminals TG1 to TG5, corresponding respectively to IDs assigned respectively to the e-connectors C1 to C5, to the respective wires branched from the external grounding line LG1. The worker effects the operation for connecting the grounding terminals TG1 to TG5 to the external grounding line LG1 while referring to an ID table (as shown in FIG. 4) stored in a storage portion (not shown) within the control unit 60. In FIG. 4, "1" in columns indicating the grounding terminals TG1 to TG5 represents a condition in which the external grounding line LG1 is connected to the relevant grounding terminal, while "0" represents a condition in which the external grounding line LG1 is not connected.

For example, IDs "1" to "5" are assigned respectively to the e-connectors C1 to C5 in this order. In this case, the worker connects the grounding terminal TG1 of the e-connector C1, the grounding terminal TG2 of the e-connector C2, the grounding terminal TG3 of the e-connector C3, the grounding terminal TG4 of the e-connector C4 and the grounding terminal TG5 of the e-connector C5 respectively to the wires branched from the external grounding line LG1. By doing so, electric power begins to be supplied to the control units 60.

In accordance with this power supply, each control unit 60 effects the setting process. First, the control unit 60 functions as a grounding line connection detection section, and effects a connection detection process for detecting that grounding terminal TG1, . . . , TG5 connected to the external grounding line LG1 among the plurality of grounding terminals TG1 to TG5 (Step S1). More specifically, when the potential of each grounding terminal TG1, . . . , TG5 supplied to the control unit 60 via the corresponding ID recognition terminal TR11, . . . , TR15 is the ground potential, the control unit 60 judges that the external grounding line LG1 is connected to it, and in contrast, when the potential of each grounding terminal TG1, . . . , TG5 is 5V, the control unit 60 judges that the external grounding line LG1 is not connected to it.

Next, each control unit 60 functions as identification information setting section, and effects an ID setting process (in Step S2) for setting the ID (identification information) corresponding to a detection result of the connection detection process of Step S1, and thereafter finishes the ID setting process.

The ID setting process is effected, for example, while referring to the ID table (as shown in FIG. 4) stored in the storage portion within the control unit 60.

As shown in FIG. 4, when the grounding terminal TG1 is connected to the external grounding line LG1, the control unit 60 sets the ID to "1", and when the grounding terminal TG2 is connected to the external grounding line LG1, the control unit 60 sets the ID to "2", and when the grounding terminal TG3 is connected to the external grounding line LG1, the control unit 60 sets the ID to "3", and when the grounding terminal TG4 is connected to the external grounding line LG1, the control unit 60 sets the ID to "4", and when the grounding terminal TG5 is connected to the external grounding line LG1, the control unit 60 sets the ID to "5".

Then, after the setting process is finished, each e-connector C1, . . . , C5 transmits signals, with the transmission destination IDs and its own ID attached thereto, and also receives signals having its own ID attached thereto.

In the e-connectors C1 to C5 of the above vehicular communication system, each control unit 60 detects that grounding terminal TG1, . . . , TG5 connected to the external grounding line LG1 among the plurality of grounding terminals TG1 to TG5, and sets the ID corresponding to the result of this detection. Therefore, even when the plurality of e-connectors C1 to C5 have the same shape, the IDs of the e-connectors C1 to C5 can be easily grasped by viewing the external grounding line LG1 connected to the grounding terminals TG1 to TG5. Therefore, the e-connectors C1 to C5 which do not required any special external part for setting the ID and can prevent an erroneous connection can be provided at a low cost.

When any of the e-connectors C1 to C5 becomes abnormal, such abnormal e-connector can be easily located from the exterior by identifying its ID. Furthermore, the grounding terminals TG1 to TG5 also serve as the ID setting terminals, and therefore if the cutting of the wire or the disconnection of the terminal should occur at any of the e-connectors C1 to C5, only that e-connector becomes defective in communication, and the other e-connectors can operate properly.

Furthermore, in each of the e-connectors C1 to C5, when the potential of any of the plurality of grounding terminals TG1 to TG5 is the ground potential, the control unit 60 detects that the external grounding line LG1 is connected to that grounding terminal. Therefore, merely by detecting the potentials of the plurality of grounding terminals TG1 to TG5, whether or not these grounding terminals are connected to the external grounding line LG1 can be detected, and the construction is simplified, so that the cost can be further reduced.

Each of the e-connectors C1 to C5 need to have three wires by which the e-connector is connected to the external grounding line LG1, the external power line LV1 and the external communication line LC1. The number of the grounding terminals TG1 to TG5 provided at each of the e-connectors C1 to C5 is the same as the number of the e-connectors C1 to C5 connected to one another via the external communication line LC1, and the different grounding terminals TG1 to TG5 of the e-connectors C1 to C5 are connected to the external grounding line LG1, and therefore the IDs can be set simultaneously when connecting the e-connectors C1 to C5 to the external grounding line LG1, and therefore it is not necessary to increases the number of the wires.

In the above first embodiment, the number of the grounding terminals TG1 to TG5 provided at each of the e-connectors C1 to C5 is the same as the number of the e-connectors C1 to C5 connected to one another via the external communication line LC1, and the different grounding terminals TG1 to TG5 of the e-connectors C1 to C5 are connected to the external grounding line LG1. However, the invention is not limited to this construction. If the addition of wires is allowed, there are provided, for example, two or three additional wires branched from the external grounding line LG1 to be connected to the plurality of grounding terminals TG1 to TG5, in which case IDs can be set according to a combination of the grounding terminals TG1 to TG5 to be connected to the external grounding line LG1. In this case, the number of IDs which can be set is (2 to the power of the number of grounding terminals)–1, although the number of the IDs which can be set in the first embodiment is merely equal to the number of the grounding terminals TG1 to TG5.

(Second Embodiment)

Figure 5:
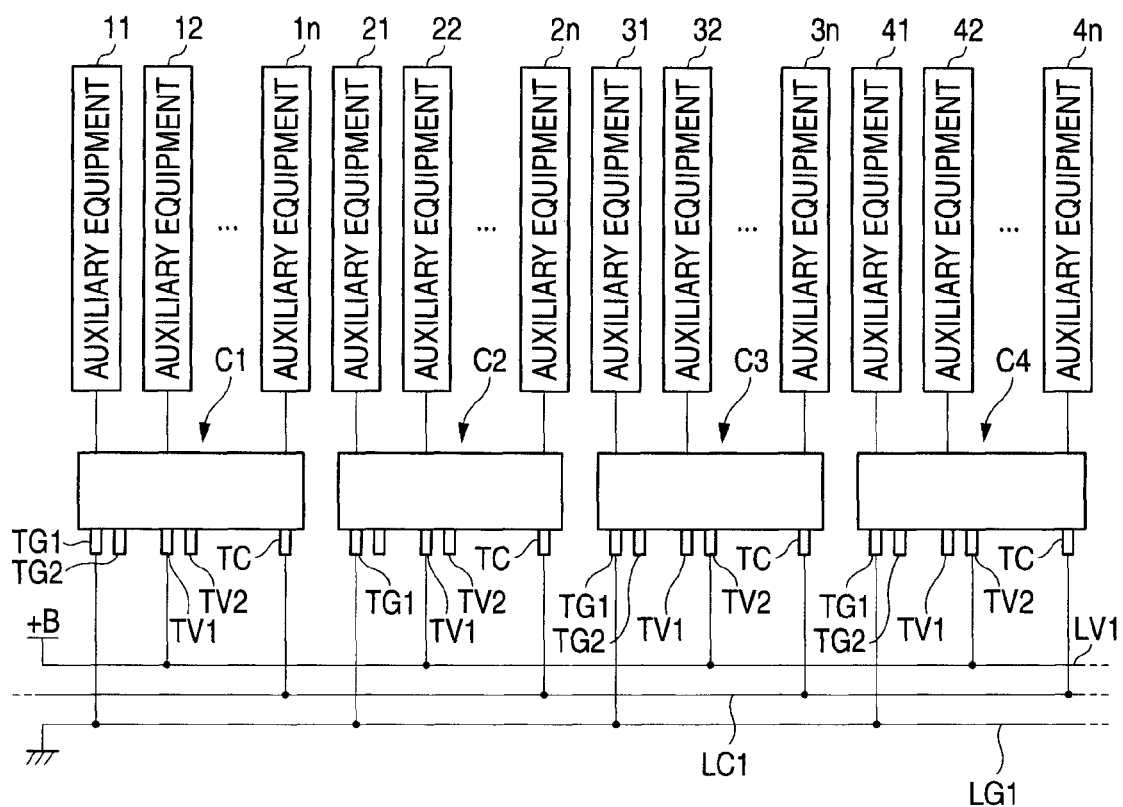
FIG. 5 is a view showing a vehicular communication system incorporating e-connectors each serving as a second embodiment of a communication apparatus of the invention.
Figure 6:
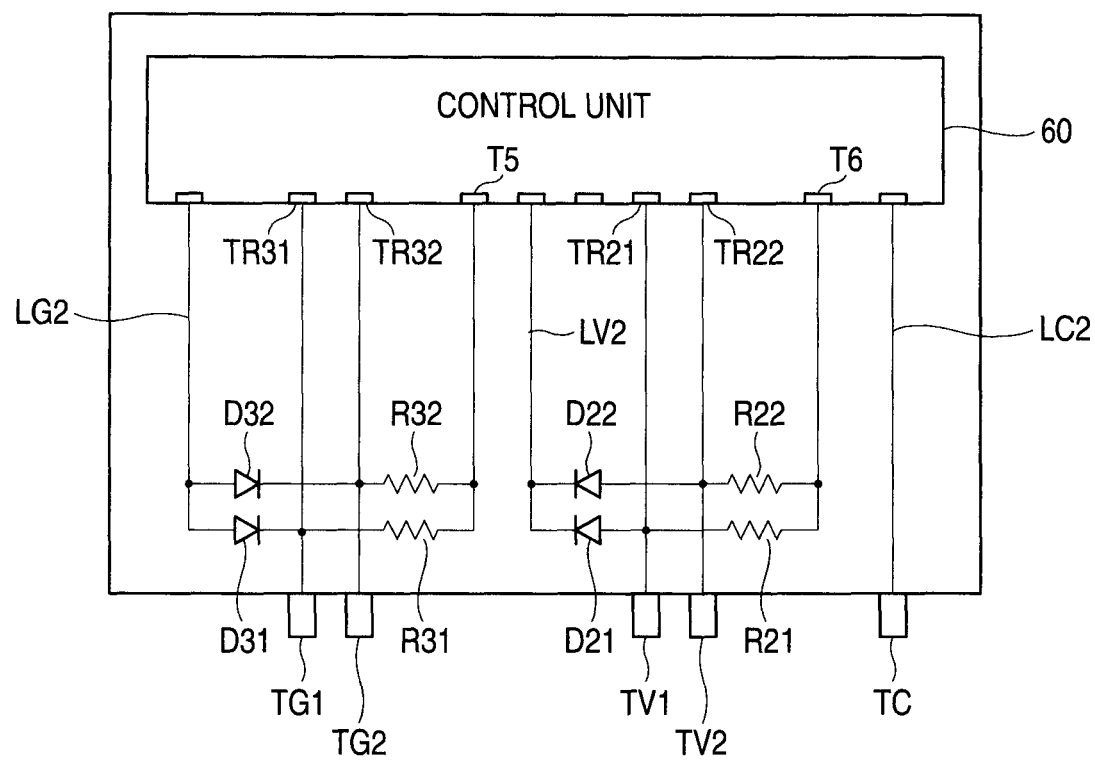
FIG. 6 is an electrical diagram of the e-connectors shown in FIG. 5.
Figure 8:
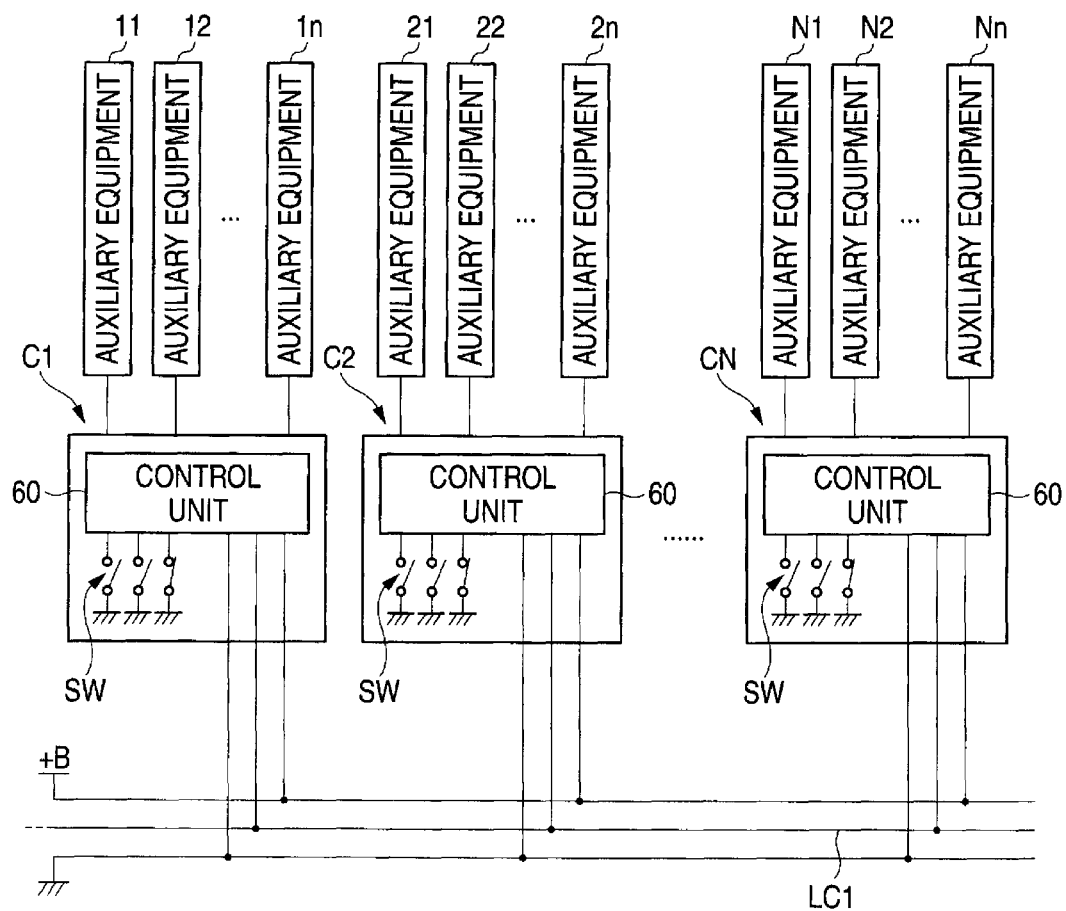
FIG. 8 is a view showing one example of a vehicular communication system incorporating conventional e-connectors.

Next, a second embodiment of the invention will be described with reference to the drawings. FIG. 5 is a view showing a vehicular communication system incorporating e-connectors C1 to C4 each serving as a second embodiment of a communication apparatus of the invention. FIG. 6 is an electrical diagram of the e-connectors C1 to C4 shown in FIG. 5. As shown in these Figures, the vehicular communication system comprises, for example, the four e-connectors C1 to C4 located respectively at portions of a vehicle. Auxiliary equipments 11 to 1n, 21 to 2n, . . . , 41 to 4n are connected to the respective e-connectors C1 to C4.

Each of the e-connectors C1 to C4 comprises a control unit 60, for example, two power terminals TV1 and TV2, a communication terminal TC and for example, two grounding terminals TG1 and TG2, these terminals being exposed to the exterior of the e-connector C1, . . . , C4. The control unit 60 comprises a CPU, etc., and controls the corresponding auxiliary equipments 11 to 1n, 21 to 2n, . . . , 41 to 4n.

The power terminals TV1 and TV2 are provided at one end of an internal power line LV2 within the e-connector C1, . . . , C4. An external power line LV1 outside the e-connectors C1 to C4 is connected to the power terminals TV1 and TV2. The control unit 60 is connected to the other end of the internal power line LV2, and is supplied with a power source voltage from the external power line LV1 via the power terminal TV1, and TV2 and the internal power line LV2.

The two power terminals TV1 and TV2 are connected to the internal power line LV2 via respective diodes D21 and D22 whose forward direction is from the power terminals TV1 and TV2 toward the internal power line LV2. The control unit 60 is connected to the internal power line LV2, and is supplied with a power source voltage from the external power line LV1 via the power terminal TV1, TV2 and the internal power line LV2.

The two power terminals TV1 and TV2 are connected to a grounding output terminal T6 via respective resistors R21 and R22, and are supplied with a ground potential. The power terminals TV1 and TV2 are connected respectively to ID recognition terminals TR21 and TR22 provided at the control unit 60.

The communication terminal TC is similar in construction to the communication terminal TC of the above first embodiment, and therefore detailed description thereof is omitted here. The grounding terminals TG1 and TG2 are connected to an external grounding line LG1 outside the e-connectors C1 to C4, and are provided at one end of an internal grounding line LG2 within the e-connector C1, . . . , C4.

The plurality of grounding terminals TG1 and TG2 are connected to the internal grounding line LG2 via respective diodes D31 and D32 whose forward direction is from the internal grounding line LG2 toward the grounding terminals TG1 and TG2. The control unit 60 is connected to the internal grounding line LG2, and is supplied with a ground potential from the external grounding line LG1 via the internal grounding line LG2 and the grounding terminal TG1, TG2.

The plurality of grounding terminals TG1 and TG2 are connected to a 5V voltage output terminal T5 via respective resistors R31 and R32, and are supplied with a voltage of 5V. The grounding terminals TG1 and TG2 are connected respectively to ID recognition terminals TR31 and TR32 provided at the control unit 60.

An ID information setting operation in the vehicular communication system of the above construction will be described below with reference to FIG. 3. First, in a manufacturing process, the worker locates the e-connectors C1 to C4 respectively at the relevant portions of the vehicle. Then, the auxiliary equipments 11 to 1n, 21 to 2n, . . . , 41 to 4n are connected to the corresponding e-connectors C1 to C4. Wires branched from the external power line LV1 are connected respectively to the corresponding power terminals TV1 and TV2 of the e-connectors C1 to C4, and wires branched from the external communication line LC1 are connected respectively to the communication terminals TC of the e-connectors C1 to C4, and wires branched from the external grounding line LG1 are connected respectively to the corresponding grounding terminals TG1 and TG2.

At this time, the worker connects the power terminals TV1 and TV2, corresponding respectively to IDs assigned respectively to the e-connectors C1 to C4, to the external power line LV1, and also connects the grounding terminals TG1 and TG2, corresponding to the IDs, to the external grounding line LG1. The worker effects the operation for connecting the power terminals TV1 and TV2 to the external power line LV1 and the operation for connecting the grounding terminals TG1 and TG2 to the external grounding line LG1 while referring to an ID table (as shown in FIG. 7) stored in a storage portion (not shown) within the control unit 60. In FIG. 7, "1" in columns indicating the power terminals TV1 and TV2 represents a condition in which the external power line LV1 is connected to the relevant power terminal, while "0" represents a condition in which the external power line LV1 is not connected. Also, "1" in columns indicating the grounding terminals TG1 and TG2 represents a condition in which the external grounding line LG1 is connected to the relevant grounding terminal, while "0" represents a condition in which the external grounding line LG1 is not connected.

For example, IDs "1" to "4" are assigned respectively to the e-connectors C1 to C4 in this order. In this case, the worker connects the power terminal TV1 of the e-connector C1, the power terminal TV1 of the e-connector C2, the power terminal TV2 of the e-connector C3 and the power terminal TV2 of the e-connector C4 respectively to the wires branched from the external power line LV1. Also, the worker connects the grounding terminal TG1 of the e-connector C1, the grounding terminal TG2 of the e-connector C2, the grounding terminal TG1 of the e-connector C3 and the grounding terminal TG2 of the e-connector C4 respectively to the wires branched from the external grounding line LG1. By doing so, electric power begins to be supplied.

In accordance with this power supply, each control unit 60 effects the setting process. First, the control unit 60 functions as a grounding line connection detection section and a power line connection detection section, and effects a connection detection process for detecting that grounding terminal TG1, TG2 connected to the external grounding line LG1 among the plurality of grounding terminals TG1 and TG2 and also for detecting that power terminal TV1, TV2 connected to the external power line LV1 among the plurality of power terminals TV1 and TV2 (Step S1).

More specifically, when the potential of each grounding terminal TG1, TG2 supplied to the control unit 60 via the corresponding ID recognition terminal TR31, TR32 is the ground potential, the control unit 60 judges that the external grounding line LG1 is connected to it, and in contrast, when the potential of each grounding terminal TG1, TG2 is 5V, the control unit 60 judges that the external grounding line LG1 is not connected to it. Also, when the potential of each power terminal TV1, TV2 supplied to the control unit 60 via the corresponding ID recognition terminal TR21, TR22 is the ground potential, the control unit 60 judges that the external power line LV1 is not connected to it, and in contrast, when the potential of each power terminal TV1 and TV2 is the power source voltage, the control unit 60 judges that the external power line LG1 is connected to it.

Next, each control unit 60 effects an ID setting process (in Step S2) for setting the ID corresponding to a detection result of the connection detection process, and thereafter finishes the ID setting process. The ID setting process is effected, for example, while referring to the ID table (as shown in FIG. 7) stored in the storage portion within the control unit 60.

In the e-connectors C1 to C4 of the above vehicular communication system, each control unit 60 effects the detection process for detecting that power terminal TV1, TG2 connected to the external power line LV1 among the plurality of power terminals TV1 and TV2 and also for detecting that grounding terminal TG1, TG2 connected to the external grounding line LG1 among the plurality of grounding terminals TG1 and TG2. Then, the control unit 60 sets the ID corresponding to the detection results of this detection process. Therefore, even when the plurality of e-connectors C1 to C4 have the same shape, the IDs of the e-connectors C1 to C4 can be easily grasped by viewing the external grounding line LG1 connected to the grounding terminals TG1 and TG2 and the external power line LV1 connected to the power terminals TV1 and TV2. Therefore, the e-connectors C1 to C4 which can prevent an erroneous connection can be provided at a low cost. Furthermore, when any of the e-connectors C1 to C4 becomes abnormal, such abnormal e-connector can be easily located from the exterior by identifying its ID.

Furthermore, in each of the e-connectors C1 to C4, when the potential of one of the plurality of power terminals TV1 and TV2 is the power source voltage, the control unit 60 detects that the external power line LV1 is connected to that power terminal. Therefore, merely by detecting the potentials of the plurality of power terminals TV1 and TV2, whether or not these power terminals are connected to the external power line LV1 can be detected, and the construction is simplified, so that the cost can be further reduced.

In the above second embodiment, the single wire branched from the external grounding line LG1 is connected to one of the grounding terminals TG1 and TG2 of each e-connector, and the single wire branched from the external power line LV1 is connected to one of the power terminals TV1 and TV2. However, the invention is not limited to this construction. If the addition of wires is allowed, the additional wires are provided for connection to the plurality of grounding terminals TG1 and TG2, in which case IDs can be set according to a combination of the grounding terminals TG1 and TG2 to be connected to the external grounding line LG1. In this case, additional IDs "5" to "8" can be further set as shown in FIG. 7.

In the above second embodiment, there are set the IDs each corresponding to both of the result of detection of the connection of the external power line LV1 relative to the power terminals TV1 and TV2 and the result of detection of the connection of the external grounding line LG1 relative to the grounding terminals TG1 and TG2. However, the invention is not limited to this construction. For example, there may be provided only one grounding terminal, in which case there are set IDs each corresponding only to the result of detection of the connection of the external power line LV1 relative to the power terminals TV1 and TV2.

The above embodiments merely show representative forms of the invention, and the invention is not limited to these embodiments. Namely, various modifications can be made without departing from the subject matter of the invention.

The present application is based on Japan Patent Application No. 2007-137023 filed on May 23, 2007, the contents of which are incorporated herein for reference.

What is claimed is:

1. A communication apparatus for performing a communication with other communication apparatus by using identification information, comprising:
   a housing;
   a plurality of grounding terminals which are respectively connected to one end of internal grounding lines provided within the housing, the plurality of grounding terminals for connecting to an external grounding line outside the housing;

a grounding line connection detection section which detects a grounding terminal connected to the external grounding line among the plurality of grounding terminals; and an identification information setting section which sets the identification information based on a detection result of the grounding line connection detection section, the apparatus further comprising a plurality of power terminals which are respectively connected to one ends of internal power lines provided within the housing for connecting to an external power line outside the housing; and a power line connection detection section which detects a power terminal connected to the external power line among the plurality of power terminals, wherein the identification information setting section sets the identification information based on both of the detection result of the grounding line connection detection section and a detection result of the power line connection detection section.

2. The communication apparatus according to claim 1, wherein the plurality of grounding terminals are connected to the internal grounding lines via respective diodes whose forward direction is from the internal grounding lines toward the grounding terminals, and are supplied with a predetermined voltage via respective resistors; and wherein when the electric potential of any of the plurality of grounding terminals is a ground potential, the grounding line connection detection section detects that the grounding terminal whose electric potential is the ground potential is connected to the external grounding line.

3. The communication apparatus according to claim 1, wherein the plurality of power terminals are connected to the internal power lines via respective diodes whose forward direction is from the power terminals toward the internal power line, and are supplied with the ground potential via respective resistors; and wherein when the electric potential of any of the plurality of power terminals is a power source voltage, the power line connection detection section detects that the power terminal whose electric potential is the power source voltage is connected to the external power line.

4. A communication apparatus for performing a communication with other communication apparatus by using identification information, comprising:

a housing;

a plurality of power terminals which are respectively connected to one end of internal power lines provided within the housing, the plurality of power terminals for connecting to an external power line outside the housing;

a power line connection detection section which detects a power line connected to the external power line among the plurality of power terminals; and an identification information setting section which sets the identification information based on a detection result of the power line connection detection section.

5. The communication apparatus according to claim 4, wherein the plurality of power terminals are connected to the internal power lines via respective diodes whose forward direction is from the power terminals toward the internal power line, and are supplied with the ground potential via respective resistors; and wherein when the electric potential of any of the plurality of power terminals is a power source voltage, the power line connection detection section detects that the power terminal whose electric potential is the power source voltage is connected to the external power line.

* * * * *